United States Patent
Lawrence et al.

[19]

[11] Patent Number: 5,948,353

[45] Date of Patent: Sep. 7, 1999

[54] GRAY IRON COMPOSITION AND BRAKE COMPONENTS FORMED THEREOF

[75] Inventors: Garth Lawrence, Farmington Hills; Cris Petersen, Commerce, both of Mich.; Paul Van Kooten, Hixon, Tenn.; William Wolfe, Haslett, Mich.

[73] Assignee: Hayes Lemmerz International, Inc., Romulus, Mich.

[21] Appl. No.: 08/992,781

[22] Filed: Dec. 17, 1997

Related U.S. Application Data

[60] Provisional application No. 60/033,645, Dec. 20, 1996.

[51] Int. Cl.$^6$ .............................. C22C 37/00; C22C 37/06
[52] U.S. Cl. ................................. 420/15; 420/26; 148/321
[58] Field of Search ........................ 420/15, 26; 148/321

[56] References Cited

U.S. PATENT DOCUMENTS

| | | | |
|---|---|---|---|
| 3,559,775 | 2/1971 | Miller | ........................................ 420/15 |
| 4,008,517 | 2/1977 | Schrader et al. . | |
| 4,121,925 | 10/1978 | Chapman et al. . | |
| 4,807,728 | 2/1989 | Suenaga et al. . | |
| 5,345,672 | 9/1994 | Ball et al. . | |

FOREIGN PATENT DOCUMENTS

| | | | |
|---|---|---|---|
| 3139973 | 4/1983 | Austria | ..................................... 420/15 |
| 118219 | 10/1978 | Japan | ..................................... 420/15 |
| 0248864 | 12/1985 | Japan | ..................................... 420/15 |

*Primary Examiner*—Deborah Yee
*Attorney, Agent, or Firm*—Marshall & Melhorn

[57] ABSTRACT

Improved gray iron compositions comprise at least about 90 weight % iron, at least about 3.40 weight % carbon, from about 1 to 2.5 weight % silicon, from about 0.4 to 1.0 weight % manganese, and from about 0.02 to 0.07 weight % tin. Preferably, the gray iron compositions of the invention also include from about 0.2 to about 0.5 weight % chromium, and may further preferably include from about 0.25 to 0.75% molybdenum and/or from about 0.3 to 1.0% copper, and may optionally also include small amounts (less than about 1%) of such elements as titanium or vanadium, as examples. The gray iron compositions which may advantageously be used in the manufacture of vehicle brake components, especially the braking surfaces of vehicle brake drums or brake rotors.

18 Claims, 1 Drawing Sheet

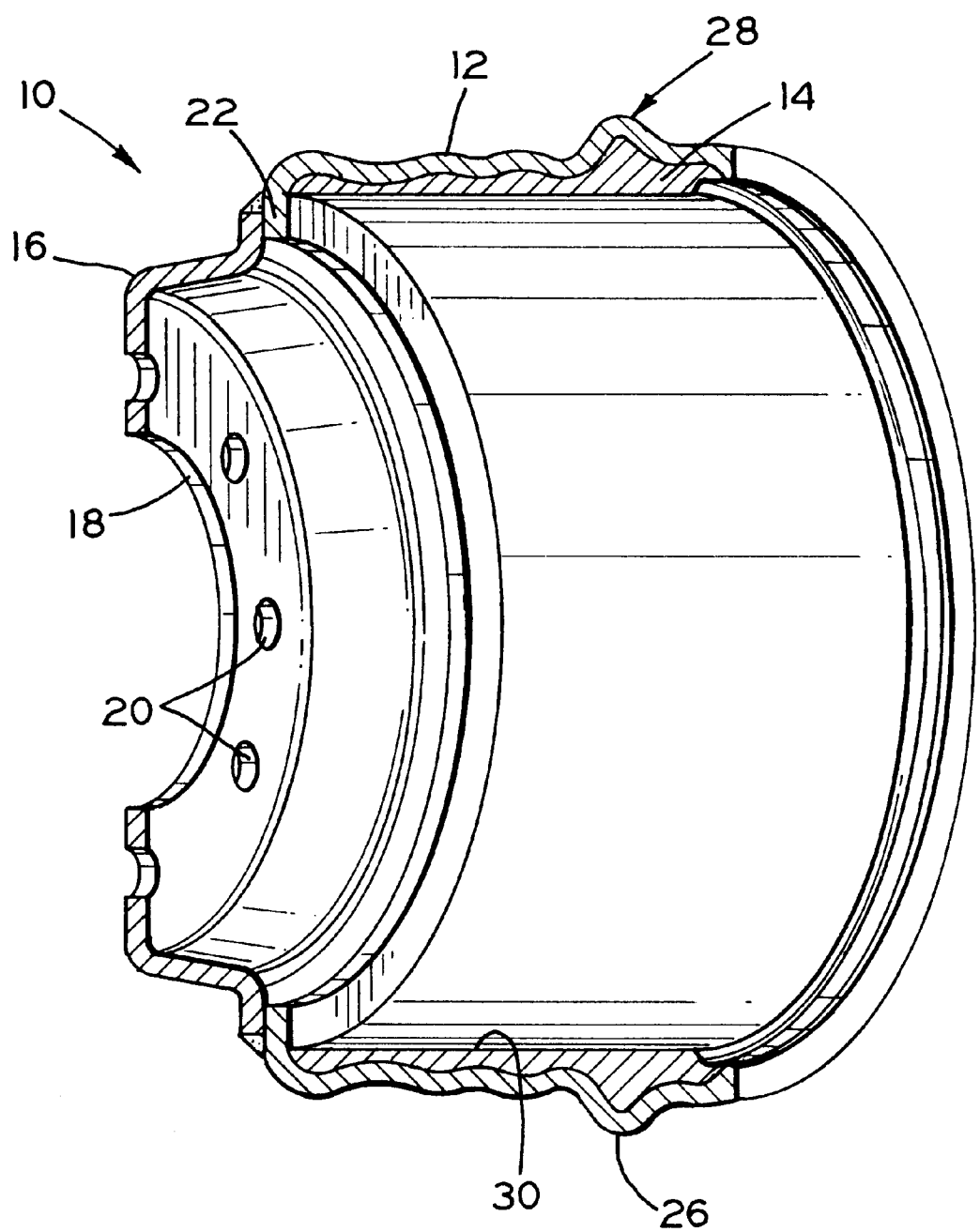

GRAY IRON COMPOSITION AND BRAKE COMPONENTS FORMED THEREOF

RELATED APPLICATION

This application is claiming the benefit, under 35 USC §119(e), of the provisional application filed Dec. 20, 1996 under 35 USC § 111(b), which was granted a Ser. No. of 60/033,645. The provisional application, Ser. No. 60/033,645, is hereby incorporated by reference.

FIELD OF THE INVENTION

This invention relates generally to gray iron compositions. More particularly, the invention relates to improved gray iron compositions which may advantageously be used in the manufacture of vehicle brake components, especially the braking surfaces of vehicle brake drums or brake rotors. The invention also relates to brake components formed of the improved gray iron compositions.

SUMMARY OF RELATED ART

Various gray iron compositions have been well known in the art for many years. Moreover, it has long been conventional to use gray iron compositions for the casting of brake components, specifically those forming braking surfaces in vehicle brake drums and rotors. For example, the SAE Standard SAE J431 describes the requirements for gray iron sand mold castings used in the automotive and allied industries, and provides specific requirements for brake drums.

As another example, U.S. Pat. No. 4,121,925 discloses a method of producing cast gray iron brake rotors with reportedly improved wear characteristics. The gray iron compositions disclosed in this patent consist of from 3.20 to 3.60% carbon, 1.77 to 2.23% silicon, 0.56 to 0.81% manganese, 0.03 to 0.103% sulfur, 0.010 to 0.11% phosphorus, 0.012 to 0.107% titanium, and 0 to 0.048% vanadium, the balance being iron, with all of the above being weight percent.

Another conventional gray iron composition used to form the braking surface of brake drums is as follows:

| Carbon | 3.45–3.65 |
|---|---|
| Silicon | 1.5–2.0 |
| Manganese | 0.6–0.9 |
| Sulfur | ≦0.12 |
| Phosphorus | ≦0.15 |
| Chromium | 0.15–0.25 |
| Molybdenum | 0.35–0.45 |
| Copper | 0.60–0.70 |

Despite the long use of gray iron compositions in the manufacture of vehicle brake components, the need continues for improved gray iron compositions which, when forming the braking surface in vehicle brakes, offer increased wear resistance.

SUMMARY OF THE INVENTION

This invention is directed to gray iron composition comprising the following, in weight percent:

| Iron | ≧90 |
|---|---|
| Carbon | ≧3.40 |
| Silicon | 1–2.5 |
| Manganese | 0.4–1.0 |
| Tin | 0.02–0.07 |

Preferably, the gray iron compositions of the invention also include from about 0.2 to about 0.5 weight % chromium. These gray iron compositions of the invention also preferably include from about 0.25 to 0.75% molybdenum and/or from about 0.3 to 1.0% copper, and may optionally also include small amounts (less than about 1%) of such elements as titanium or vanadium, as examples.

The gray iron compositions which may advantageously be used in the manufacture of vehicle brake components, especially the braking surfaces of vehicle brake drums or brake rotors. The invention also relates to brake components formed, at least in part, of the improved gray iron compositions. These gray iron compositions, when forming the braking surface in such vehicle brake components, offer increased wear resistance.

BRIEF DESCRIPTION OF THE DRAWING

The advantages of the invention will become readily apparent to those skilled in the art from the following detailed description of a preferred embodiment when considered in the light of the accompanying drawing FIGURE, which is a diametrically sectioned perspective view of a finished brake drum in accordance with a preferred embodiment of the invention.

DETAILED DESCRIPTION OF THE INVENTION

An improved gray iron composition is provided in accordance with the invention. The gray iron composition of the invention comprises the following:

| Carbon | ≧3.40 |
|---|---|
| Silicon | 1–2.5 |
| Manganese | 0.4–1.0 |
| Tin | 0.02–0.07 |

Unless otherwise indicated, all percentages used herein are weight percents. In accordance with a preferred embodiment of the invention, the composition also includes chromium in the range of from about 0.2% to about 0.5%.

These gray iron compositions of the invention also preferably include from about 0.25 to 0.75% molybdenum or from about 0.3 to 1.0% copper or both, and may optionally also include small amounts (less than about 1%) of such elements as titanium or vanadium, as examples. Although generally not desired, the gray iron compositions of the invention will typically include sulfur in an amount not greater than about 0.20%, but preferably not greater than about 0.12%, and phosphorus in an amount not greater than about 0.25%, but preferably not greater than about 0.15%. In all of the compositions of the invention, of course, the balance is iron, there being at least about 90% iron in all cases.

In accordance with various preferred embodiments of the invention, carbon is present in an amount of from about 3.45% to about 3.65%, silicon is present in an amount of from about 1.5% to about 2.0%, manganese is present in an amount of from about 0.6% to about 0.9%, chromium is present in an amount of from about 0.25% to about 0.45%, and tin is present in an amount of from about 0.04% to about 0.06%. In other preferred embodiments, the gray iron compositions and from about 0.6% to about 0.7% copper.

Thus, a most preferred gray iron composition in accordance with the invention comprises:

| Carbon | 3.45–3.65 |
|---|---|
| Silicon | 1.5–2.0 |
| Manganese | 0.6–0.9 |

-continued

| | |
|---|---|
| Sulfur | ≦0.12 |
| Phosphorus | ≦0.15 |
| Chromium | 0.25–0.45 |
| Molybdenum | 0.35–0.45 |
| Copper | 0.60–0.70 |
| Tin | 0.04–0.06 |

The gray iron compositions of the invention may be utilized with standard foundry practices and conventional production methods to form gray iron castings. Castings formed of the gray iron compositions of the invention exhibit moderately increased hardness, but significantly improved resistance to abrasion and wear. In particular, although not wishing to be bound by any particular theory, it is believed that the level of tin included in the composition creates a finer microstructure, reducing the level of free ferrite in the cast iron. The higher levels of chromium in the preferred embodiments are believed to contribute to the increased hardness and wear resistance of the gray iron compositions of the invention.

In accordance with another aspect of the invention, vehicle brake components, especially those components forming a braking surface, are formed of the improved gray iron compositions of the invention. Thus, the gray iron compositions of the invention may be especially advantageously used in the formation of vehicle brake rotors or brake drums, formed of either all cast gray iron or of a composite structure.

The drawing FIGURE illustrates a particularly preferred embodiment of this aspect of the invention. A composite brake drum 10 is shown in the drawing which is comprised of an annular shell or band 12, preferably formed of steel, surrounding and metallurgically bonded to a cast iron structure 14 formed of the improved gray iron composition of the invention. A drum mounting disc or back 16 is connected to one edge of the band 12 and has openings 18 and 20 for mounting the brake drum 10 in the conventional manner.

In one known method of manufacturing the drum 10, the band 12 is first formed from sheet steel stock and rolled to a configuration having the inwardly-turned end flange 22 and a plurality of outwardly directed strengthening ribs 26. With the band 12 externally fixtured, the gray iron structure 14 is centrifugally cast therein to form a composite brake ring 28. After the ring has cooled, drum back 16 is welded to the flange 22. Alternatively, the drum mounting disc 16 may be formed integrally with the band 12 in the desired configuration prior to the casting of the gray iron structure 14. The radially inwardly directed braking surface 30 of the ring 28 is then finished on a cylinder of revolution coaxial with mounted openings 18 and 20, as is conventional. Apart from the gray iron composition of the structure 14, the structure and manufacture of the brake drum 10 are known, and are described in more detail in U.S. Pat. Nos. 2,153,364, 5,138,757, and 5,345,672, each of which is incorporated herein by reference.

Testing was conducted to compare the wear resistance of a braking surface formed of an embodiment of the gray iron compositions of the invention with that formed of a conventional gray iron composition. The conventional brake drums utilized in the testing were Centrifuse® Brake Drums commercially available from Hayes Wheels International, Inc. (and formerly available from Motor Wheel Corporation). These brake drums are of a composite structure substantially as shown in the drawing FIGURE and described above.

The conventional gray iron compositions used to form the braking surface of the comparison drum were as follows:

| | |
|---|---|
| Carbon | 3.45–3.65 |
| Silicon | 1.5–2.0 |
| Manganese | 0.6–0.9 |
| Sulfur | ≦0.12 |
| Phosphorus | ≦0.15 |
| Chromium | 0.15–0.25 |
| Molybdenum | 0.35–0.45 |
| Copper | 0.60–0.70 |

Additional brake drums of the same composite structure were provided with a cast gray iron braking surface of the following composition in accordance with the invention:

| | |
|---|---|
| Carbon | 3.45–3.65 |
| Silicon | 1.5–2.0 |
| Manganese | 0.6–0.9 |
| Sulfur | ≦0.12 |
| Phosphorus | ≦0.15 |
| Chromium | 0.35–0.45 |
| Molybdenum | 0.35–0.45 |
| Copper | 0.60–0.70 |
| Tin | 0.04–0.06 |

In the comparative testing, 12 trucks were used at each of two different locations: one hilly and the other relatively flat. The above-described comparison brake drums were installed at four drive axle positions (front left, front right, rear left, and rear right) on 6 of the trucks at each location. The brake drums in accordance with the invention were installed at the same four positions on the remaining 6 trucks at each location.

After the test vehicles had been driven from between 150,000 and 400,000 miles, the reduction in drum weight and diameter were determined for each brake drum on a per mile basis. The brake drums formed in accordance with the invention exhibited average wear which was less than the conventional brake drums by approximately 38% at the hilly location and approximately 21% at the relatively flat location. At the same time, it was determined that there had been no significant increase in the wear on the brake linings.

In accordance with the provisions of the patent statutes, the invention has been described in what is considered to represent its preferred embodiments. However, it should be noted that the invention can be practiced otherwise than as specifically illustrated and described without departing from its spirit or scope.

What is claimed is:

1. A gray iron composition comprising:

at least about 90 weight % iron;

at least about 3.40 weight % carbon;

from about 1 to about 2.5 weight % silicon;

from about 0.4 to about 1.0 weight % manganese;

from about 0.02 to about 0.07 weight % tin; and from about 0.25 to 0.75 weight % molybdenum.

2. A gray iron composition as defined in claim 1, further comprising about 0.20 to about 0.45 weight % chromium.

3. A gray iron composition as defined in claim 1, further comprising from about 0.35 to about 0.45 weight % molybdenum.

4. A gray iron composition as defined in claim 1, further comprising from about 0.3 to about 1.0 weight % copper.

5. A gray iron composition as defined in claim 1, further comprising from about 0.6 to about 0.7 weight % copper.

6. A gray iron composition as defined in claim 1, further comprising about 0.04 to about 0.06 weight % tin.

7. A gray iron composition comprising:

| | |
|---|---|
| Iron | >90 |
| Carbon | 3.45–3.65 |
| Silicon | 1.5–2.0 |
| Manganese | 0.6–0.9 |
| Sulfur | ≦0.12 |
| Phosphorus | ≦0.15 |
| Chromium | 0.25–0.45 |
| Molybdenum | 0.35–0.45 |
| Copper | 0.60–0.70 |
| Tin | 0.04–0.06. |

8. A vehicle brake component having a braking surface, said surface being formed of a flake gray iron comprising:
   at least about 90 weight % iron;
   at least about 3.40 weight % carbon;
   from about 1 to about 2.5 weight % silicon;
   from about 0.4 to about 1.0 weight % manganese;
   from about 0.02 to about 0.07 weight % tin; and
   from about 0.25 to 0.75 weight % molybdenum.

9. A vehicle brake component as defined in claim 8 wherein the gray iron forming said braking surface includes from about 0.20 to 0.5 weight % chromium.

10. A vehicle brake component as defined in claim 8, wherein the gray iron forming said braking surface further includes from about 0.35 to about 0.45 weight % molybdenum.

11. A vehicle brake component as defined in claim 8, wherein the gray iron forming said braking surface further includes from about 0.3 to about 1.0 weight % copper.

12. A vehicle brake component as defined in claim 8, wherein the gray iron forming said braking surface further includes from about 0.6 to about 0.7 weight % copper.

13. A vehicle brake component as defined in claim 8, wherein the gray iron forming said braking surface includes from about 0.04 to 0.06 weight % tin.

14. A composite brake drum wherein an annular steel shell surrounds and is metallurgically bonded to a cast iron structure including a braking surface, the improvement being forming said cast iron structure of a gray iron composition comprising:
   at least about 90 weight % iron;
   at least about 3.40 weight % carbon;
   from about 1 to less than 2.5 weight % silicon;
   from about 0.4 to about 1.0 weight % manganese;
   from about 0.02 to about 0.07 weight % tin; and
   from about 0.25% to about 0.75 weight % molybdenum.

15. A gray iron composition comprising:
   at least about 90 weight % iron;
   at least about 3.40 weight % carbon;
   from about 1.5 to about 2.0 weight % silicon;
   from about 0.4 to about 1.0 weight % manganese;
   from about 0.02 to about 0.07 weight % tin; and
   from about 0.25 to 0.75 weight % molybdenum.

16. A gray composition as defined in claim 15, further comprising from about 0.6 to about 0.9 weight % manganese.

17. A gray composition as defined in claim 1, further comprising from about 0.6 to about 0.9 weight % manganese.

18. A gray composition as defined in claim 1, further comprising up to 0.15 weight % phosphorus.

* * * * *